United States Patent [19]

Veraart

[11] 4,019,259
[45] Apr. 26, 1977

[54] AUTOMATIC REGULATION OF DRYING TIME IN A CLOTHES DRYING MACHINE

[75] Inventor: Pierre H. Veraart, Mississauga, Canada

[73] Assignee: GSW Appliances Limited, Weston, Canada

[22] Filed: Oct. 15, 1974

[21] Appl. No.: 514,296

[52] U.S. Cl. .................................. 34/48; 34/53
[51] Int. Cl.² ........................................ F26B 19/00
[58] Field of Search .......................... 34/46, 48, 53

[56] References Cited
UNITED STATES PATENTS

| 2,524,438 | 10/1950 | Graves | 34/48 |
| 3,031,768 | 5/1962 | Kurowski | 34/48 |
| 3,186,107 | 6/1965 | Raley | 34/53 |
| 3,571,941 | 3/1971 | Garfield | 34/48 |
| 3,874,089 | 4/1975 | Offutt | 34/48 |

Primary Examiner—John J. Camby
Assistant Examiner—Larry I. Schwartz

[57] ABSTRACT

A control arrangement for automatically regulating the drying time of a clothes dryer in accordance with the clothes load placed in the dryer comprising a signal generating means in the form of a self-cycling thermostat responsive to the cooling effect of the clothes load which varies with the size of the load and arranged to terminate the clothes dryer heater energization when the clothes have reached a predetermined degree of dryness.

6 Claims, 3 Drawing Figures

AUTOMATIC REGULATION OF DRYING TIME IN A CLOTHES DRYING MACHINE

This invention relates to improvements in clothes dryers and more particularly to the provision of a novel control arrangement to automatically regulate the drying time in accordance with the clothes load placed in the dryer whereby the dryer function can be terminated substantially immediately upon the clothing reaching a dry state or, if it is desired to terminate drying while the clothing contains some residual moisture, the clothes can be consistently dried to the same degree of dryness, i.e. dampness, regardless of the size of the load placed in the dryer.

BACKGROUND OF THE INVENTION

It has been the common practise in the drying of clothes in a clothes drying machine for the user to set the timer controlling the drying time to a selected value which is expected to be adequate to dry the clothing placed in the dryer. As the user usually is uncertain as to the actual weight of clothing being dried, to ensure drying, an excess of time is set on the timer and the dryer operation continues longer than necessary, leading to the possibility of scorching or otherwise damaging the clothing, as well as consuming unnecessary power and adding to the drying costs. Alternately, to prevent this overdrying or to attempt to leave some residual moisture in the clothing, the timer may be set to operate the dryer for a period estimated to be less than the time required for complete drying, in which case the clothing may be inadequately dried and the dryer operation has to be cycled on and off by the user and the clothing inspected after each drying period to assess the degree of dampness thereof.

Air temperature control in larger dryers operating on a nominal line voltage of 208 or 240 v, is obtained through On-Off control of the dryer heater by means of a thermally activated switch which is arranged to maintain the air temperature in the dryer at a value to be effective for the fabric to be dried. During the "Off" periods of the heater, a timer motor is energized. Repeated application of these timer energized periods will eventually bring the timer to the end of its travel thereby terminating the drying.

The premise on which the functioning of this proposed arrangement is based, is that the supposed relation between duty cycle of the thermal switch and the clothes load is such that the frequency of the timer motor "On" periods (heater Off) decreases with increasing clothes loads. That is, the heater will have to stay on longer (and the timer will therefore be accumulating less time) to maintain the air at an appropriate temperature, say 145° F, when a large mass of wet clothes is being dried than when the load is small. Therefore, the theory is that even though the timer is pre-set to the same value, the actual drying time increases with clothes load size.

Unfortunately, even in such a larger dryer having such full line voltage across the heater, the demand on the heater to raise the air temperature to the 145° F, at which point it is practical to allow the heater to cycle, is such that effectively very little cycling occurs while the clothing retains any significant amount of moisture. Once the clothes load reaches in the neighborhood of 3 lbs. of clothing and above no significant drying time regulation can be achieved. Even with smaller loads, the sensitivity of the system is limited and effective regulation cannot be achieved.

In the case of smaller dryers which are required to operate on 120 v. A.C. of say 15 amperes maximum, the power supplied is totally insufficient to raise the temperature of the air in the dryer to even close to a point, e.g. an air temperature of 145°, where the system can tolerate cutting off the heater while the clothing retains any significant amount of moisture and therefore such heater cycling is completely impractical with respect to these small machines.

SUMMARY OF THE INVENTION

In observing air temperature conditions in a clothes dryer, it has been found that with a constant heat input, that is, the heater remaining on continuously, the temperature within the dryer for any particular clothes load remains essentially constant for the greater part of the drying cycle until the water retention level has dropped to approximately 5% after which the temperature rises fairly rapidly to a nominal value of approximately 150°. This essentially constant temperature for a given heater energization has been found to be progressively higher and the drying cycle progressively shorter as the clothes loads are progressively reduced, and vice versa.

Thus any given clothes load appears to operate as a heat absorbing sink having a generally constant heat absorbing capacity over a wide range of moisture content down to about 5%.

The present invention utilizing this observation provides for a simple efficient sensor which is responsive to the cooling effect of the clothes load and thereby constitutes a load sensor, and this sensor is utilized to control or regulate the drying time in accordance with the load sensed, reducing drying time for smaller loads where the cooling effect is less, and increasing drying time for larger loads when the cooling effect is greater, but without interfering with the heat delivered to the clothes by the heating circuit. With this arrangement there is provided for the first time a means of affording automatic drying time regulation in small dryers, and as well, a means of providing efficient automatic drying time regulation in large dryers.

If the requirements of the dryer are to always dry clothes to an essentially completely dry condition, then the sensor responding to the cooling effect of the clothes load may be used, according to the invention, to simply signal the detected rise in air temperature from the generally constant temperature during drying of the clothes down to the approximately 5% water retention level and to thereafter terminate the drying cycle. However, frequently the clothes are required to be "damp dry" only corresponding to a water retention of approximately 15% to 30% and therefore, in such circumstances, the signalling of the temperature rise following reduction of the water retention below about 5% will not provide the requisite drying function.

The present invention through the use of a sensor sensing the cooling effect of the clothes load permits the accomplishment of damp dry drying through control of the timer motor by the sensor, whereby the time accumulated in the timer motor with the passing of time is made proportional to the essentially constant air temperature in the dryer for a given load such that time is accumulated more rapidly for smaller loads and higher ambient drying temperatures and time is accumulated less rapidly for larger loads and lower ambient drying temperatures. Thus for a given timer setting for say damp dry clothes, loads of different magnitudes can be dried to essentially the same condition.

According to the preferred form of the invention, the sensor comprises a self-cycling bi-metal thermostat exposed to the dryer temperature having an associated or internal heater with this heater connected through the thermostat contacts so that it will initially be On when voltage is applied to the thermostat until the internal temperature of the thermostat rises to a point above the highest dryer temperature to be encountered during the drying operation (about 150°) where the contacts open thereby disconnecting the internal heater. The thermostat is then subject to the relatively lower air temperature of the dryer due to the presence of the wet clothes load whereupon the internal temperature of the thermostat will be caused to drop and when it has dropped sufficiently, the internal heater will be reenergized and the cycle repeated. The rate of cycling for a given clothes load will remain substantially constant for a given clothes load until, if drying is allowed to continue, the moisture in the clothing drop to a point where the dryer temperature rapidly increases at which time the self-cycling rate of the thermostat will drop signalling the termination of the drying operation.

Further according to the preferred form of the invention, the self-cycling thermostat is arranged to energize a timer motor when the internal temperature of the thermostat causes contacts to open to shut off its heater, that is, the bi-metal on opening the heater contacts will close timer motor energizing contacts. The length of time that the timer motor energizing contacts remain closed thereby accumulating time on the timer will in turn depend on the cooling effect of the clothes load, that is, the size of the clothes load with the result that less time will be accumulated for larger loads and more time will be accumulated for smaller loads against a preselected "time" value set on the timer. With this arrangement the timer setting can be set for say damp dry and the accumulated time on the timer when it reaches this time value setting will terminate the drying operation while the clothing still retains some moisture content, say 15% to 30%, and before the cycling rate of the thermostat drops off. The time value to be set on the timer for say damp dry may be empirically set for a given clothes load in the dryer with the self-cycling thermostat arranged to supply the energization of the timer motor. Thereafter the sensing action of the self-cycling thermostat will automatically regulate the actual drying time required to bring other clothes loads to essentially the same damp dry condition.

These and other objects and features will become apparent from the following detailed description of the preferred embodiment of the invention taken in conjunction with the accompanying drawings.

DETAILED DESCRIPTION OF THE DRAWINGS

As is well known, the standard clothes dryer employs a rotating drum in which the wet clothes are placed and these clothes are then subjected to the heat from a heater while being tumbled in the drum as the drum rotates. The conventional large dryer normally has its heater connected across the full line voltage, e.g. 208 to 240 volts, and if the clothes load is small enough, the applied heat can raise the air temperature in the dryer to and maintain it at a desired temperature level for good clothes drying. It has been found that good clothes drying occurs if the air temperature is maintained at about 145° F so that in any drying operation it is desirable to operate the dryer so that the air temperature is maintained at as high a temperature as possible up until the 145° temperature is reached.

In the case of a dryer which is required to operate on the household 110–120 volt A.C. outlet at 15 amps maximum, it will be appreciated that there will not be sufficient power to produce the heat necessary to raise the dryer air temperature to the 145° level and it will be necessary to energize the dryer heater continuously to maximize the dryer air temperature.

In working with the drying characteristics of small heaters, it has been noted that for a given clothes load the air in the dryer quickly rises to a particular temperature and then remains at essentially that temperature until the water retention has dropped substantially. Once the retention level has dropped approximately 5%, the dryer air temperature rises rapidly from the essentially constant temperature to a nominal value of approximately 150° F.

Figure 1:
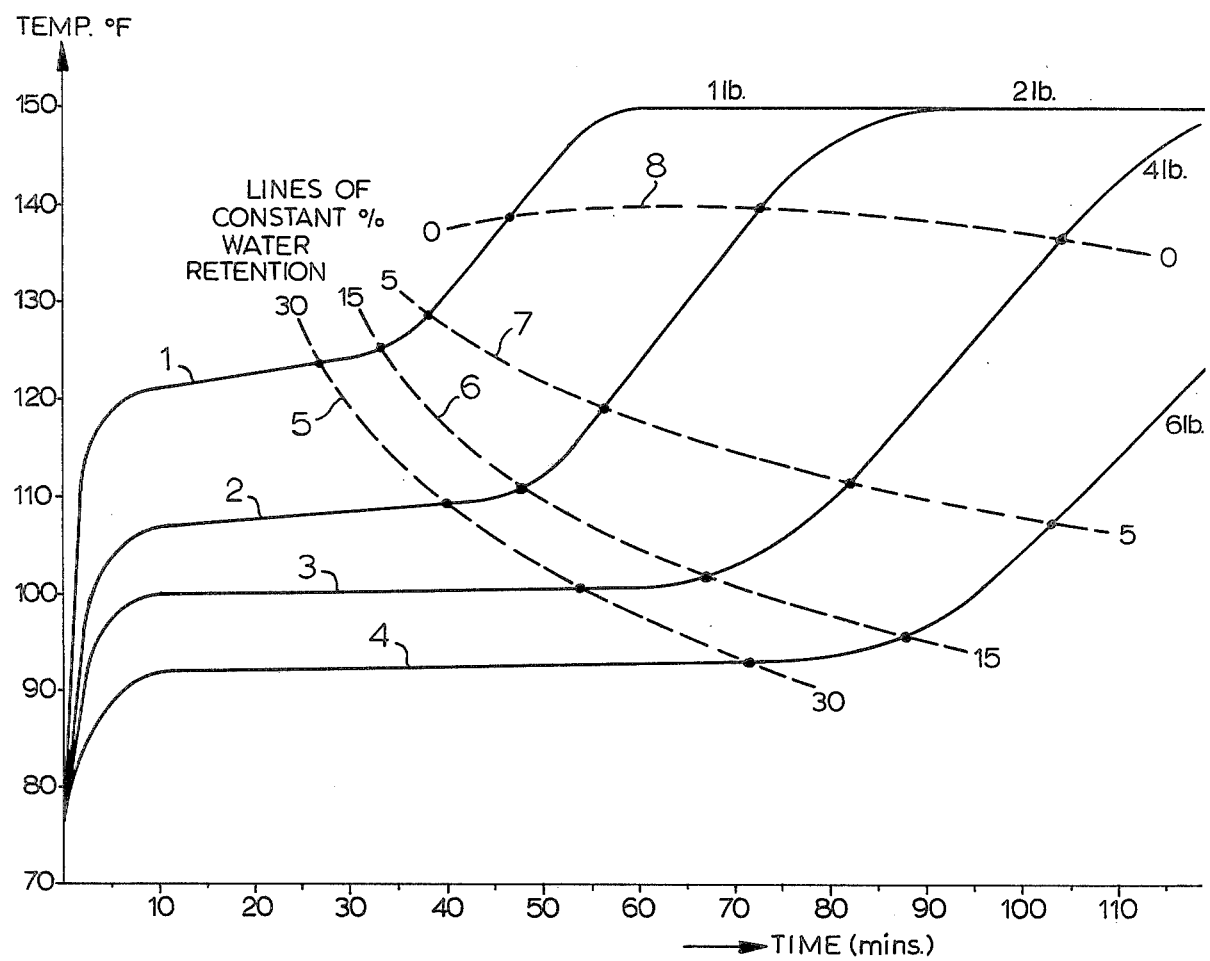
FIG. 1 is a graph illustrating the relationship between dryer air temperature and time for a given heat input with varying clothes loads.

This fact is illustrated in FIG. 1 in which the curve 1 represents the air temperature in the dryer connected accross 120 volt 15 amp maximum circuits with a one pound clothes load placed in the dryer. It will be seen that the temperature of the air in the dryer quickly rises to just over 120° F and is maintained fairly constant for a substantial period. Curve 2 represents the temperature versus time graph under the same heat input for a two pound load. Similarly, curves 3 and 4 represent the temperature/time graphs under the same heat input rates for clothes loads of four and six pounds, respectively. Curves 5, 6, 7 and 8 are lines of constant percent water retention representing 30%, 15%, 5% and 0% water retention, respectively.

It will be noted that until the water retention has dropped below 30%, there is relatively little change in the dryer air temperature with time. An insignificant temperature rise is indicated as the water retention drops from 30 to 15% and a somewhat greater temperature rise is indicated as the water retention drops from 15% to 5%, after which a substantial temperature rise takes place.

From the above observations it is apparent that the clothes load over a wide range of water retention exhibits a substantial constant heat absorption characteristic to hold the dryer air temperature constant as the drying operation proceeds. As the clothes load gets larger, the air temperature which the clothes maintains in the dryer is lower and the drying time required to reduce the water retention level is increased. Put another way, as the clothes load increases, the cooling effect of the clothing increases and the drying time has to be extended in proportion to this cooling effect to either dry the clothes complete with zero water retention, or to dry them to some specific degree of water retention, e.g. to damp dry condition in which the water retained is approximately 15% to 30%.

The present invention provides a sensing device which is responsive to the cooling effect of the clothing, thereby constituting a load sensor and this load sensor is utilized to control the length of drying time. Thus the present invention enables the automatic regulation of the drying time to dry clothes either to the fully dry condition or to some degree of water retention e.g. damp dry, irrespective of the load size placed in the dryer.

Figure 2:
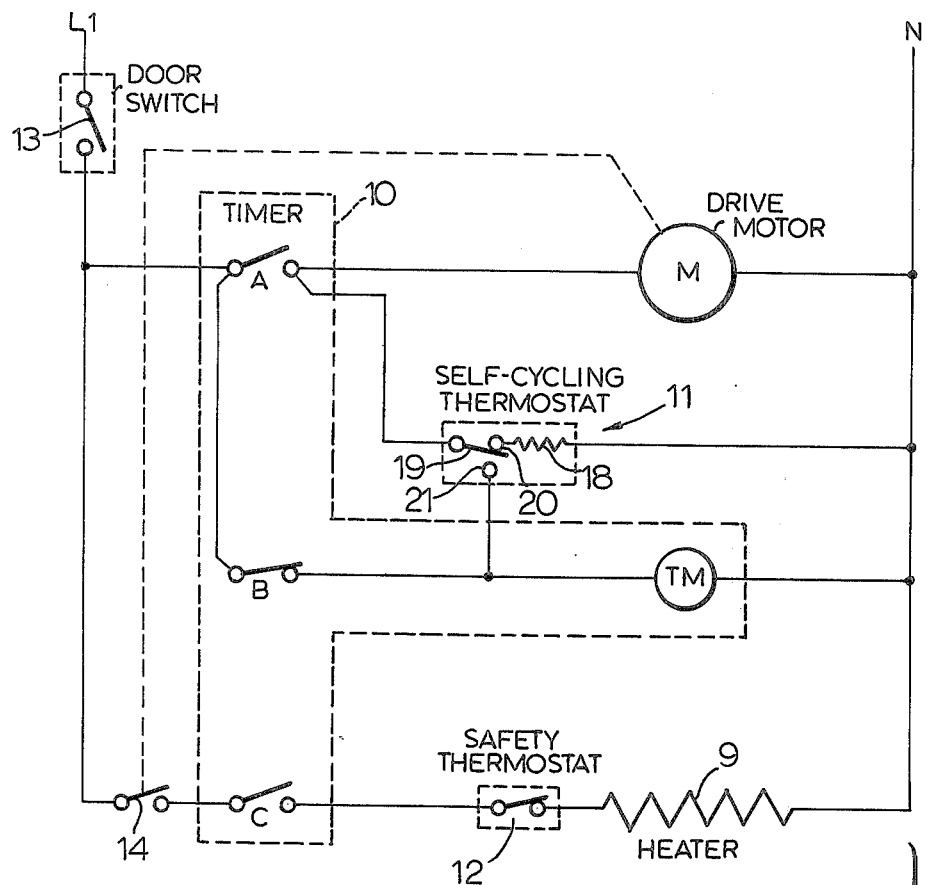
FIG. 2 is a schematic diagram illustrating the principal dryer circuit incorporating a drying time regulating device responsive to the clothes load in accordance with the invention, the time diagram for the circuit being associated therewith.
Figure 2:
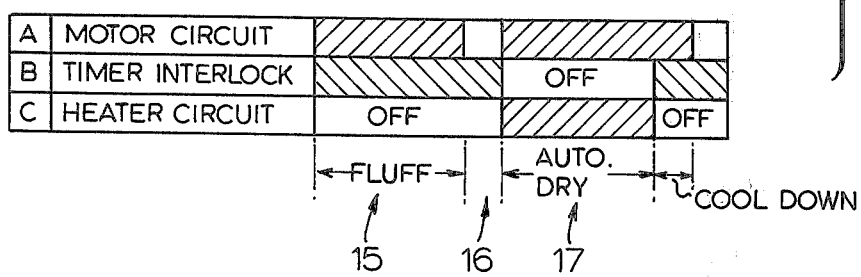

FIG. 2 is a schematic diagram of the principal circuit and the timing diagram of a small dryer energized from the normal household outlet, e.g. between line L1 and neutral N which would normally be of the order of 120 volts A.C. 15 ampere maximum service.

As will be understood, the dryer is provided with a drive motor M for driving the drum of the dryer for the tumbling of the clothes during the drying operation. The dryer is also provided with a heater 9 for providing the heat for the drying operation. A timer 10 having a timer motor TM is provided and the timer functions in response to accumulated running time on the timer motor to control the operation of the dryer in accordance with the timing diagram designated.

In this connection the drive motor M is connected between line L1 and neutral N through a switch A controlled by the timer and the timing motor is alternately connected across L1 - N either through the timer interlock switch B or alternatively through the drive motor switch A and the sensor device generally designated at 11 constituted in the preferred form of the invention by a self-cycling thermostat. The heater 9 is connected across L1 - N through switch C which is under control of the timer and through a safety thermostat 12 which will open the heater circuit in the event of an undue temperature rise through some misfunctioning of the machine.

The entire machine is safeguarded by a safety door switch 13 and preferably a motor actuated switch 14 which closes on motor rotation is provided to prevent heater operation when the drive motor is not operating.

From the timing diagram, it will be seen that during the fluff period designated at 15 the timer will have operated to close switch A causing the drive motor M to run causing the drum to revolve and the clothes to tumble. At the same time, the heater switch C will be held open so that the heater 9 is de-energized.

The timer interlock switch B will be closed so that the timer motor will accumulate time continuously until the time set on the timer has expired. The time interval designated at 16 following fluffing maintains the heater circuit de-energized and the motor circuit is de-energized, while the timer shuts itself off (this is not shown but in inherent in these timers). During the period designated at 17 and labelled "automatic dry", the motor circuit is energized by the timer closing the switch A but the timer interlock switch B is opened and the heater circuit is closed through closing of switch C. The running time accumulated on the timing motor is now dependent upon the functioning of the sensor 11. This sensor comprising a self-cycling thermostat has an internal or associated heater 18 and a bi-metallic contact or switch arm 19 which is initially closed as illustrated in FIG. 2 against contact 20 to connect the heater 18 across L1 to N through motor switch A. Upon the heater 18 heating the bi-metal 19 to a predetermined temperature in excess of the maximum dryer air temperature, the bi-metal will be actuated to open contact with contact 20 and to close with contact 21, now placing the timer motor in circuit between L1 and N through the motor switch A while de-energizing the internal heater 18. The bi-metal 19 will remain in timer energizing position closing contact 21 until it cools down sufficiently to a temperature determined by the differential of the thermostat, at which time it returns to close with contact 20, re-energizing the heater 18 and de-energizing the timer motor TM. The differential of the thermostat, as is well understood is specified as: (temperature at which contact open)—(temperature of which contact closes).

With reference to FIG. 1 and considering that the dryer is drying a one pound load of clothing, it will be appreciated that very shortly after commencing of the drying operation, when the bi-metal is heated by the heater 18 and moved to the timer motor energizing position against contact 21, it will be subject to an internal dryer air temperature of the order of slightly more than 120° F. Thus the temperature differential between the bi-metal and the ambient internal dryer air temperature will be relatively small which may be of the order to 10° to 20° F or less and it will take an appreciable period for the bi-metal to cool down to open the timer motor and re-energize the internal heater. Because of the close association between the bi-metal and the internal heater 18, the internal ambient air temperature in the dryer will have little effect on the length of time required for the heater to raise the temperature of the bi-metal to drive it back to contact-making position with contact 21 to re-energize the timer motor and de-energize the internal heater. The timer motor will again accumulate time until the ambient internal dryer air temperature has cooled the bi-metal sufficiently to return it once again for re-cycling. Because of the relatively little cooling effect of the internal air temperature of the dryer with the one pound clothes load, the duty cycle, i.e. the ratio of timer energized time over cycle time of the system will be relatively high and the timer motor will be energized and accumulating time against the time set on the timer for the major portion of the elapsed time in any elapsed time interval. On the other hand, where the clothes load is say six pounds, and the ambient internal dryer air temperature is just slightly over 90°, the cooling effect of this internal air temperature will be substantially greater and will effect a comparatively rapid return of the bi-metal 19 from its closed position with contact 21 energizing the timer motor, to the initial position closing contact 20 to energize the internal heater 18. Thus the duty cycle in the case of the six pound clothes load will be substantially lower than in the case of the one pound clothes load and the dwell time of the bi-metal 19 making contact with contact 21 will be much shorter in the case of the six pound clothes load as compared to the one pound clothes load. The net result is that during any elapsed period of time, the time accumulated on the timer motor in the case of the six pound load is substantially smaller than the time accumulated on the one pound load.

It will be apparent that the two and four pound loads will provide proportionate cycling rates between the one pound and the six pound load and the accumulated time on the timer motor for a given period of elapsed time will be generally progressively decreasing as the size of the clothes load is increasing.

It will be appreciated that if drying continues, until the clothes are completely dry, that is zero moisture retention, and the internal air temperature in the dryer as illustrated in FIG. 1, rises to the nominal value of 150° F, the cycling rate of the sensor 11 constituted by the self-cycling thermostat will drop to zero or essentially zero for each of the clothes loads and if the sole function of a dryer were always to dry clothes to a completely dry condition, the cycling rate change of the sensor to substantially zero substantially immediately after the clothes have passed through the zero moisture retention condition, could be detected in any number of ways apart from a timer motor and this change of cycling rate utilized as the means of terminating the drying operation. However, it is normally desired to provide a dryer which can dry clothes to a damp dry condition in which from about 5 to about 30% of the moisture is retained so that the clothing may be ironed or otherwise advantageously handled. In this case, the drying must be terminated before the relatively rapid fall-off of the cycling rate that occurs afte zero moisture retention. In this connection it has been found that if a given clothes load is introduced into a given dryer and the timer setting determined for drying such given load to the desired damp dry condition, this predetemined timer setting, due to the automatic regulation provided by the cooling effect of the varying clothes loads on the sensor 11, automatically provides essentially the same degree of dryness in the clothing, regardless of the clothes load.

Figure 3:
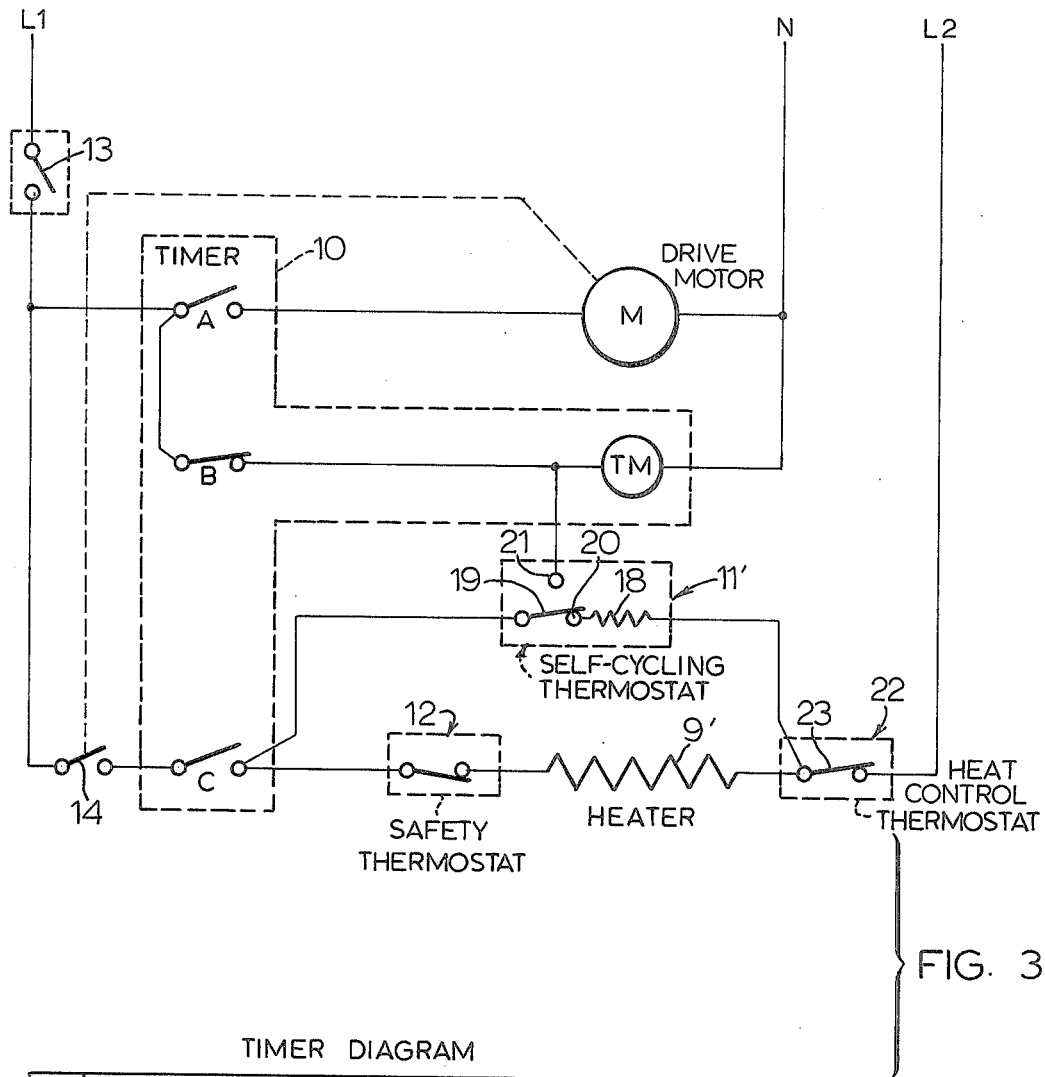
FIG. 3 is a schematic diagram and associated timing diagram corresponding to FIG. 2 but illustrating the use of the clothes load sensor regulator in association with a heater circuit connected across full line voltage with provision for cycling the heater.

FIG. 3 illustrates the use of a sensor 11' corresponding to the sensor 11 used to provide automatic regulation of drying time in a large clothes dryer in which the heater 9' is connected between line L1 and line L2 which may be phase to phase of an incoming single three wire or three phase hydro-service brought into the house. As a circuit of FIG. 3 is essentially the circuit of FIG. 2, with the exception of the provision of the heat control thermostat 22 and the connection of the sensor 11' in series with the thermostat 22 rather than the motor switch A, like parts have been given the same designation in FIG. 3 as appear in FIG. 2. In both cases the timing diagrams are the same.

In the FIG. 3 arrangement, since there is sufficient power available to drive the internal air temperature of the dryer up to 145° F at which good drying occurs, a heat control thermostat 22 is provided having a bi-metal element 23 which is arranged to normally close the switch, as illustrated in FIG. 3, to energize the heater 9' but upon the internal dryer air temperature rising excessively above the 145° F, this bi-metal element 23 will open, de-energizing the heater until the internal air temperature drops back again to the desired value. It will be understood that the demand on the heater 9' is such that the bi-metal element 23 will only disconnect the heater for very brief periods and then only when the clothes load is relatively small, as clothes loads appreciably above 3 pounds frequently require the essentially continuous application of heat to maintain the 145° temperature internally of the dryer. It has been found that by connecting the sensor 11' in series with the heat control thermostat 22, so that the internal heater 18 of the sensor is initially energized as before on the commencement of dryer operation effective automatic regulation of the drying time is achieved. It will be understood that for small clothes loads in the dryer, the dryer internal air temperature (which may be measured in the exhaust stream) will be raised to the 145° level (or such other predetermined temperature selected) much quicker than in the case of the presence of a large clothes load. The net result is that the dwell time of the bi-metal 19 on the contact 21 connecting the timer motor for accumulating time will initially be much greater for the small load than the large load. Cycling of the heat control thermostat 23, further serves as a correcting function to the sensor thermostat for those loads requiring temperature control since the duty cycle of the thermostat is also dependent on the clothes load size up to a certain value.

From the foregoing it will be seen that for any given elapsed time, more time will be accumulated on the timer motor for a small load than for a large load in which the dwell time of the bi-metal 19 on the contact 21 energizing the timer motor TM will be appreciably less in the initial portion of the drying cycle. It has therefore been found that with the self-cycling thermostat or sensor 11' connected as disclosed, the timer can be set to provide damp dry drying as well as zero per cent water retention drying for a given clothes load and the sensor 11' will automatically regulate the drying time to correspond to the different clothes loads placed in the dryer so that all sizes of clothes loads can be dried consistently to substantially the same desired degree of moisture retention.

It will be understood that various modifications and alterations may be made from the preferred embodiments of the invention illustrated, as will be apparent to those skilled in the art, without departing from the spirit of the invention or scope of the appended claims.

I claim:

1. In a clothes dryer, a heater for drying a clothes load placed in the dryer, means for energizing said heater to initiate clothes drying, and means to regulate drying time in accordance with the size of clothes load placed in the dryer to dry the clothes to a predetermined degree of dryness and to thereafter terminate drying, said regulating means comprising signal generating means operatively responsive to the cooling effect of the clothes load during heater energization without altering heater energization and means responsive to signals generated by said signal generating means for terminating heater energization when said signal indicates that the clothes have reached the predetermined degree of dryness, said signal generating means comprising a self-cycling thermostat having an internal heater, a bi-metal element carrying at least one contact and at least one fixed contact, said contacts being closed to energize said internal heater initially upon energization of said dryer heater, the heat from said internal heater acting on said bi-metal element effecting opening of said contact and de-energization of said internal heater, and the cooling effect of the clothes load acting on said bi-metal element upon opening of said contacts and effecting closing of said contacts and energization of said internal heater, whereby the thermostat is rendered self-cycling at a rate and duty cycle corresponding to said cooling effect and said means responsive to said signal generating means comprises means responsive to the rate of cycling and duty cycle of said self-cycling thermostat.

2. A clothes dryer as claimed in claim 1 in which said self-cycling thermostat has a second fixed contact, and said bi-metal element carries a second contact adapted to close with said second fixed contact on opening of the aforesaid first mentioned contacts under heat from said internal heater, and said means responsive to the rate of cycling and duty cycle of said self-cycling thermostat comprises a timer having its motor energized upon closing of said second contact carried by said bi-metal element with said second fixed contact.

3. In a clothes dryer of the type in which clothes are tumbled in a drum while being subjected to heat, a heater for heating clothing placed in the dryer and means controlling said dryer heater to automatically regulate the drying time to dry clothes substantially to a predetermined degree of dryness irrespective of the size of clothes load introduced into the dryer, said means comprising a timer having an operating motor, said timer being arranged to energize said dryer heater to initiate the drying cycle and to de-energize said heater to terminate the drying cycle upon a predetermined amount of running time being accumulated on said timer motor corresponding to the desired degree of clothes dryness, and load sensing means responsive to the cooling effect of the clothes load in the dryer to control said timer motor, said load sensing means comprising a self-cycling load sensing thermostat having a two position heat responsive switch and an associated heater for said heat responsive switch, said switch being in a first one of said two positions on initial energization of said dryer heater and connected to energize said associated heater and de-energize said timer motor, said associated heater on reaching a predetermined temperature operating said heat responsive switch to the second one of said two positions to de-energize said associated heater and energize said timer motor without altering dryer heater energization, said heat responsive switch being subject to the cooling effect of the clothes load in the dryer and upon cooling to a predetermined temperature, returning from said second position to said first position to de-energize said timer motor and re-energize said associated heater to initiate a second cycle of said self-cycling thermostat, the size of the clothes load and hence cooling effect thereof regulating the cycling rate and duty cycle of said thermostat and hence the length of time the timer motor is energized to accumulate running time against said predetermined amount required for said timer to de-energize said dryer heater.

4. A clothes dryer as claimed in claim 3 in which said heat responsive switch is a bi-metal element.

5. A clothes dryer as claimed in claim 3 in which second self-cycling thermostat means are provided independent of said timer to cycle said dryer heater upon air temperatures in the dryer reaching about 145° F to maintain dryer air temperature at about said 145° F.

6. A clothes dryer as claimed in claim 5 in which said self-cycling load sensing thermostat is connected in series with said second self-cycling thermostat.

* * * * *